US006827540B2

(12) United States Patent
Walker et al.

(10) Patent No.: US 6,827,540 B2
(45) Date of Patent: Dec. 7, 2004

(54) VERTICAL CELLULAR POWER BRIDGE ROLL-OUT SERVICE SYSTEM AND ASSOCIATED METHOD

(75) Inventors: Steven D. Walker, Etowah, NC (US); William R. Hudson, Hendersonville, NC (US); Irving A. Gibbs, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 23 days.

(21) Appl. No.: 10/338,305

(22) Filed: Jan. 8, 2003

(65) Prior Publication Data

US 2004/0131452 A1 Jul. 8, 2004

(51) Int. Cl.[7] .................................................. B65G 1/00
(52) U.S. Cl. ....................... 414/281; 414/286; 414/427; 414/495
(58) Field of Search ................................ 414/281, 286, 414/427, 495

(56) References Cited

U.S. PATENT DOCUMENTS

| | | | |
|---|---|---|---|
| 5,096,358 A | * | 3/1992 | Plant et al. .................. 414/495 |
| 5,181,821 A | * | 1/1993 | King, Sr. ..................... 414/427 |
| 6,046,917 A | | 4/2000 | Gibbs et al. |
| 6,394,743 B1 | * | 5/2002 | Marsden et al. ............ 414/495 |

\* cited by examiner

Primary Examiner—Joseph Valenza
(74) Attorney, Agent, or Firm—Martin J. Moran

(57) ABSTRACT

A power bridge rollout service system for removing and installing a power bridge, the power bridge having a housing with an external bus assembly. The power bridge rollout service system includes a roller assembly, an enclosure assembly, and a dolly assembly. The roller assembly is structured to support the power bridge and has a plurality of wheels. The enclosure assembly has a frame assembly structured to support the power bridge and has two wheel tracks. The dolly assembly has a frame assembly, a vertical lifting device, and a plurality of wheels. The vertical lifting device and wheels are coupled to the dolly frame assembly. The vertical lifting device acts upon a work platform such as a skid table assembly. The skid table assembly has a generally flat lifting plate. The skid table assembly may be raised so that the lifting plate is at the same general height as the frame assembly wheel tracks. Thus, the lifting plate is adjacent to the frame assembly wheel tracks so that the roller assembly and power bridge may be rolled from the enclosure assembly onto the skid table assembly. Once the roller assembly and power bridge are on the dolly assembly, the power bridge may be transported away from the enclosure assembly.

17 Claims, 8 Drawing Sheets

VERTICAL CELLULAR POWER BRIDGE ROLL-OUT SERVICE SYSTEM AND ASSOCIATED METHOD

BACKGROUND OF THE INVENTION

1. Field of the Invention

This invention relates to devices for installing and removing power bridges and, more specifically, to a power bridge installation/removal system and a method of utilizing the system.

2. Background Information

Excitation control systems utilize a power bridge to convert alternating current to a direct current. The power bridge is generally block shaped having an external bus assembly disposed at the top. The power bridge is about thirty-two by twenty-seven by forty-six inches and may weigh up to 1000 pounds. Typically, the power bridge is disposed in an enclosure having a rugged frame. The power bridge is usually disposed on a raised platform located within the enclosure. The platform is, typically, more than a foot above the bottom of the enclosure. In the prior art, the power bridge merely rested on the platform and did not include any installation or removal devices. As such, the installation or removal of the bulky power bridge was a time and labor intensive event requiring a technician to use an overhead winch to lift the power bridge and brute force to move the power bridge into, or out of, the enclosure.

There is, therefore, a need for an installation/removal system for a power bridge to reduce the time and effort required to install/remove a power bridge.

There is a further need for an installation/removal system for a power bridge that can be adapted to power bridge and enclosures presently in use.

There is a further need for an installation/removal system for a power bridge that can be adapted to act as a transport device for a power bridge.

SUMMARY OF THE INVENTION

These needs, and others, are met by the present invention that provides a power bridge removal system having a roller assembly with a plurality of wheels and which encloses the power bridge, a power bridge enclosure assembly having a set of wheel tracks structured to cooperate with the roller assembly, and a dolly assembly structured to securely mate with the power bridge enclosure and which can be adapted to be a transport means. The roller assembly includes, preferably, four wheels, disposed in pairs on two opposite sides of the assembly. The roller assembly wheels travel on the two wheel tracks that are part of the enclosure. Preferably, the wheels are disposed at the bottom of the power bridge roller assembly and the wheel tracks are structured to support the power bridge from below. The dolly includes a frame assembly, a lifting device, an interchangeable connector device, and a plurality of wheels. The lifting device is coupled to the dolly frame assembly and structured to move a connector device vertically. The connector device is structured to be coupled to various work platforms, for example, a skid table or lifting yoke. The skid table includes a generally horizontal flat plate with an upwardly open V-flange on one edge. The V-flange is structured to connect to an engagement member, typically a vertical planar member, on the power bridge enclosure. In operation, the dolly assembly is used to remove the power bridge from, or install said power bridge in, the enclosure assembly. To do this, the work platform is disposed adjacent to the enclosure assembly and then coupled to the roller assembly. That is, the user prepares the enclosure and power bridge by removing access panels and disconnecting the power bridge bus from any lines so that the power bridge is free to be removed. At this point the power bridge is disposed within the roller assembly and the roller assembly is resting on the wheel tracks. The dolly, with the skid table assembly attachment, is then moved adjacent to the enclosure. The lifting means is actuated to lift the skid table assembly. As the skid table assembly is raised, the V-flange engages the engagement member on the enclosure. The V-flange is sized and positioned so that when the engagement member moves into the V-flange, the skid table assembly plate is drawn immediately adjacent to, and level with, the wheel tracks. The power bridge is then removed from the enclosure by rolling the roller assembly containing the power bridge onto the skid table assembly. The skid table assembly, preferably, includes a wheel lock to secure the power bridge. Once the wheel lock is engaged, and the roller assembly is coupled to the skid table assembly, the skid table assembly is lowered until the V-flange is disengaged from the engagement member and the dolly assembly may be moved away from the enclosure. If required, the skid table assembly can be disposed on the floor so the lifting device may be decoupled from the skid table assembly and coupled to a lifting yoke. The lifting yoke is structured to be coupled to the power bridge at yoke brackets located on the sides of the power bridge housing. Thus, if needed, the power bridge may be lifted off the skid table assembly and deposited on another surface, e.g. a shipping pallet or worktable. Installation of a power bridge is, essentially, the reverse of the removal procedure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
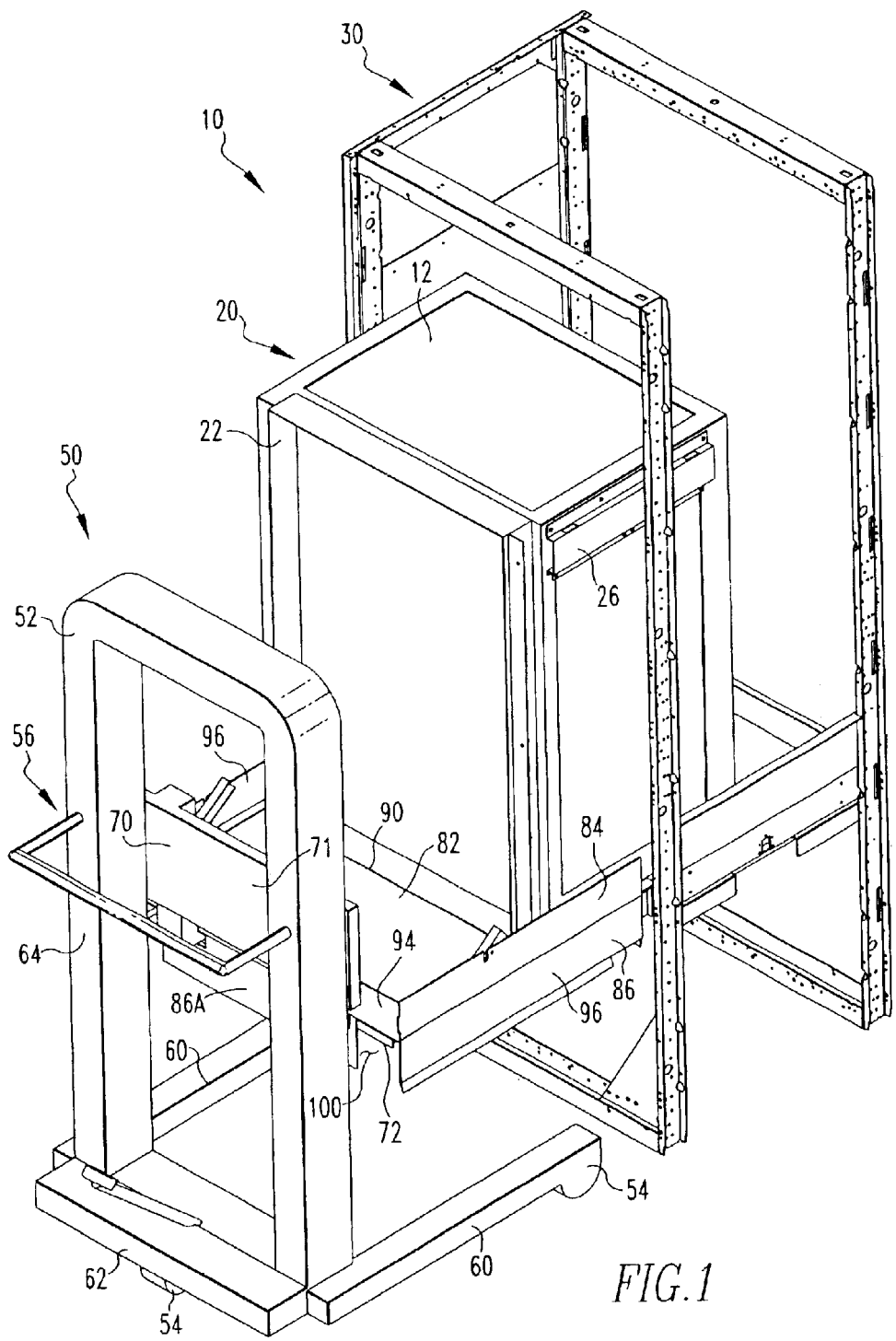
FIG. 1 is a schematic isometric view of the dolly coupled to the enclosure and with the power bridge partially removed.
Figure 2:
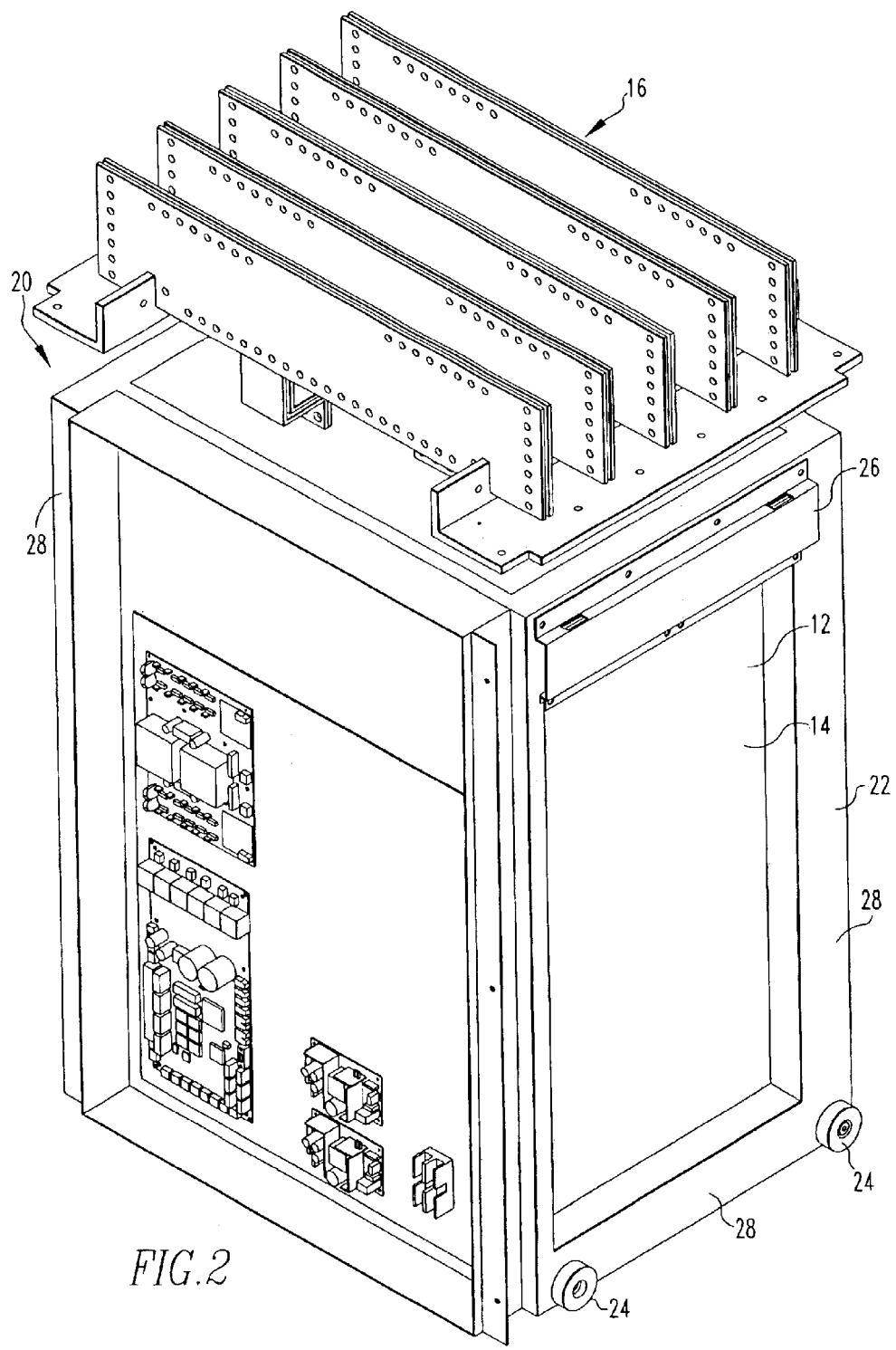
FIG. 2 is an isometric view of the right side and back side of a power bridge disposed in a roller assembly of the service system.

As shown in FIG. 1, a power bridge rollout service system 10 includes a roller assembly 20, an enclosure assembly 30, and a dolly assembly 50. As shown in FIG. 2, the power bridge 12 includes a housing 14 and an external bus assembly 16 extending from the top of the power bridge housing 14. The roller assembly 20 is structured to enclose and support the power bridge 12. The roller assembly 20 includes a frame assembly 22, a plurality of wheels 24, preferably two pairs of wheels disposed on opposite sides of the roller assembly frame assembly 22, and a pair of yoke brackets 26. The roller assembly frame assembly 22 includes a plurality of elongated, rigid members 28 which are, generally, coupled at the ends at right angles thereby forming a rectangular box. The roller assembly frame assembly 22 may further include a bottom plate (not shown) to support the power bridge 12. Each wheel 24 is disposed at the bottom of, and rotatably coupled to, the roller assembly frame assembly 22.

Figure 3:
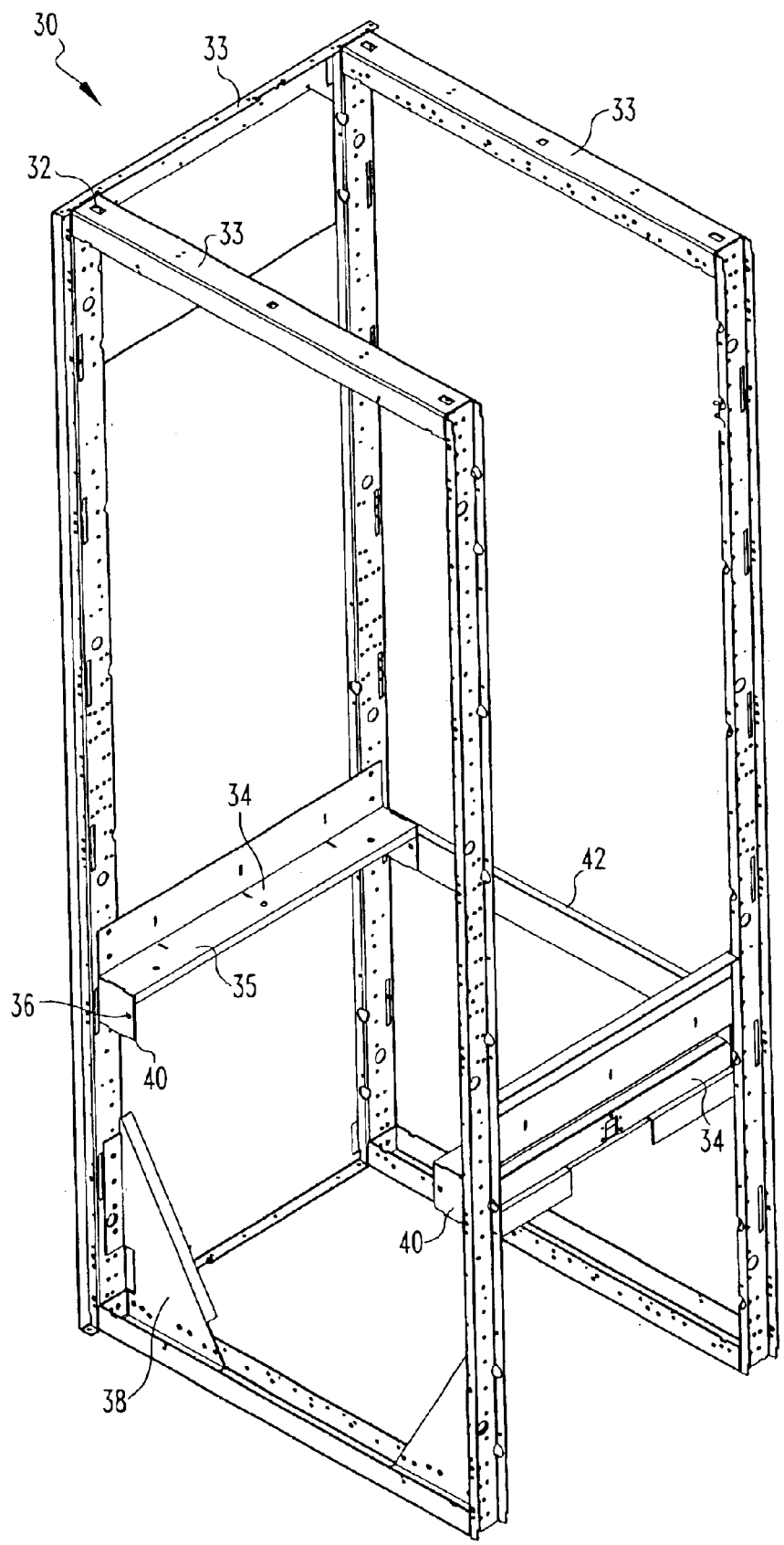
FIG. 3 is a partially cut-away isometric view of the enclosure with the power bridge removed for clarity.
Figure 8:
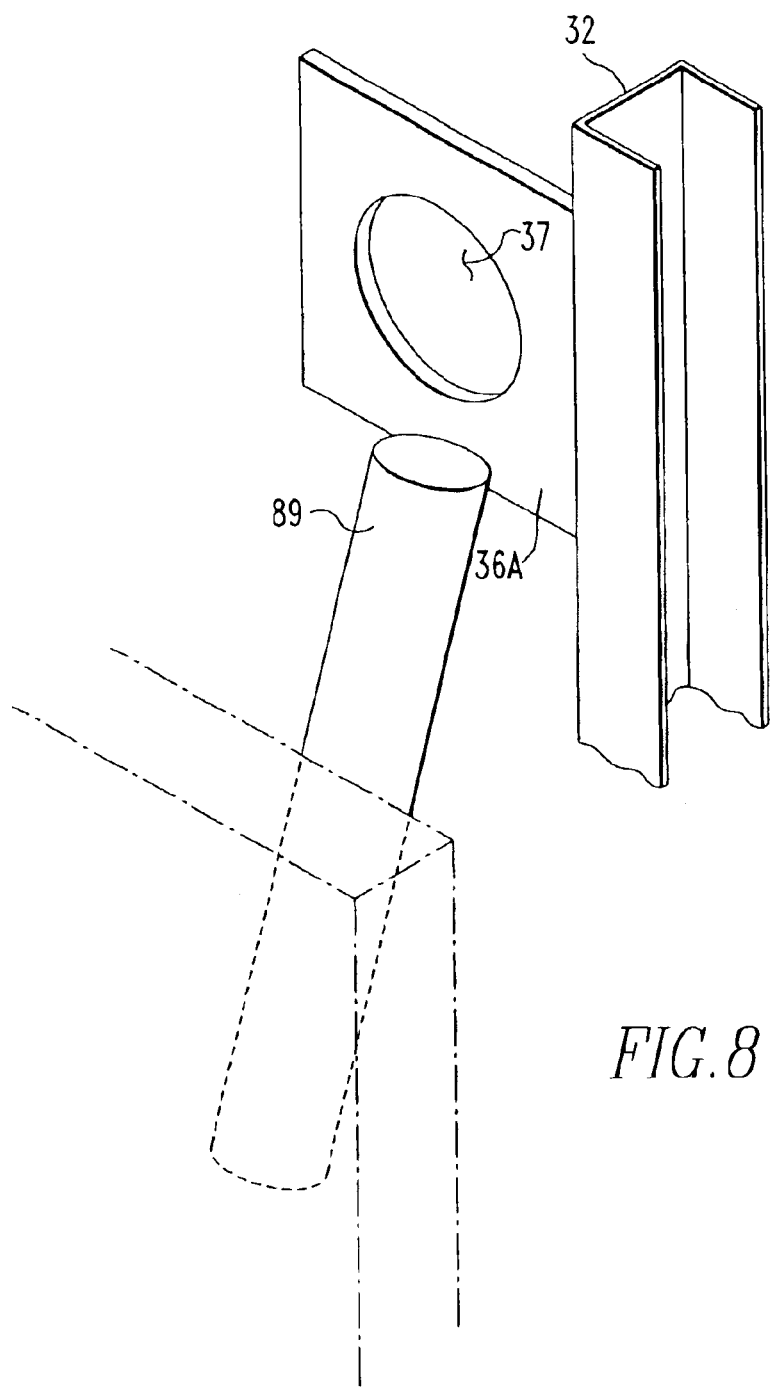
FIG. 8 is a detail view of an alternate coupling device.

As shown in FIG. 3, a second component of the power bridge rollout service system 10 is an enclosure assembly 30 having a frame assembly 32, a pair of generally parallel wheel tracks 34, at least one engagement member 36, and a plurality of sidewalls 38. The enclosure assembly frame assembly 32 includes a plurality of elongated rigid members 33 which are, generally, coupled at the ends at right angles thereby forming a rectangular box. The two wheel tracks 34 are disposed on opposite sides of the enclosure assembly frame assembly 32 and extend in a spaced, parallel relation. The wheel tracks 34 are generally flat, horizontal, elongated members 35 which provide a path for the roller assembly wheels 24 as described below. Preferably, the wheel tracks 34 are located about twenty-eight inches from the bottom of the enclosure assembly 30. The engagement member 36 is, preferably, a generally flat plate member 40 coupled to the enclosure assembly frame assembly 32. The plane of the plate member 40 extends in a direction generally perpendicular to the axis of the wheel tracks 34. That is, typically, the plate member 40 is a vertical plate. Moreover, there are preferably two such plate members 40, each disposed adjacent to, but below, one of the wheel tracks 34. The plate member 40 extends vertically and in a direction generally perpendicular to the axis of the wheel tracks 34. Alternatively, as shown on the backside of the enclosure assembly 30 shown in FIG. 3, the engagement member 36 may be an elongated bar 42 coupled to the enclosure assembly frame assembly 32 adjacent to, but below, the wheel tracks 34. Additionally, as described hereinafter, the engagement member 36 may have other shapes, for example, as shown in FIG. 8, a vertical plate 36A having an opening 37.

Figure 4:
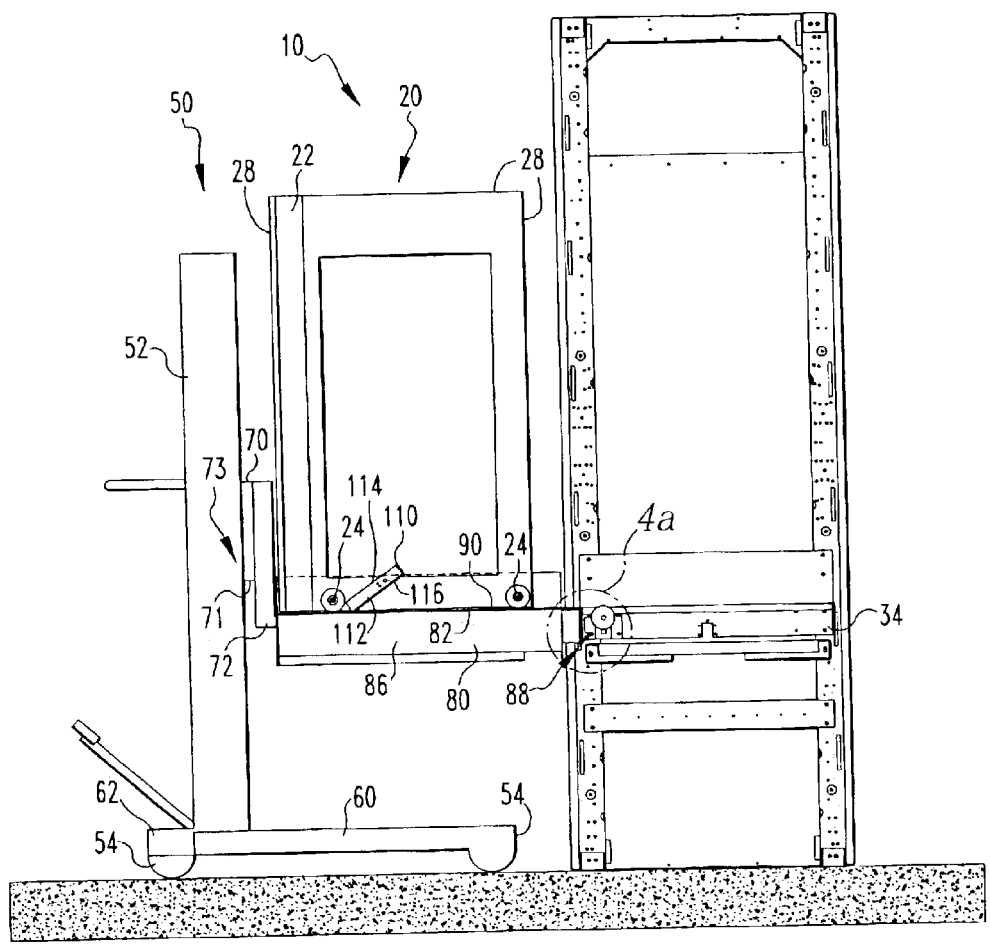
FIG. 4 is a schematic side view of the dolly coupled to the enclosure with the power bridge removed.

As shown in FIGS. 1 and 4, another component of the power bridge rollout service system 10 is a dolly assembly 50. The dolly assembly 50 includes a frame assembly 52, a plurality of wheels 54, rotatably disposed at the bottom of the dolly assembly frame assembly 52, and a lifting device 56. The dolly assembly frame assembly 52 preferably includes two lower horizontal members 60, a lower base member 62, and a vertical member 64. The two lower horizontal members 60 extend in a generally parallel direction and are coupled to, and held in a spaced relationship by, the base member 62. The vertical member 64 is a U-shaped member extending upwardly from the base member 62. The lifting device 56 may be mechanical, pneumatic, or hydraulic. As is known in the art, the functional components of the lifting device 56 are generally located within the base member 62 and the vertical member 64. The lifting device 56 includes a connector device 70, preferably a backplate 71. The backplate is further coupled to various removable work platforms 73 such as a lift fork 72 or a bridge yoke assembly 75, described hereinafter. The lift fork 72 includes two generally horizontal, flat, elongated members 74 that are removably coupled to the backplate 71. When actuated, the lifting device 56 causes the backplate 71, and therefore the lift fork 72, to move in a vertical direction.

Figure 5:
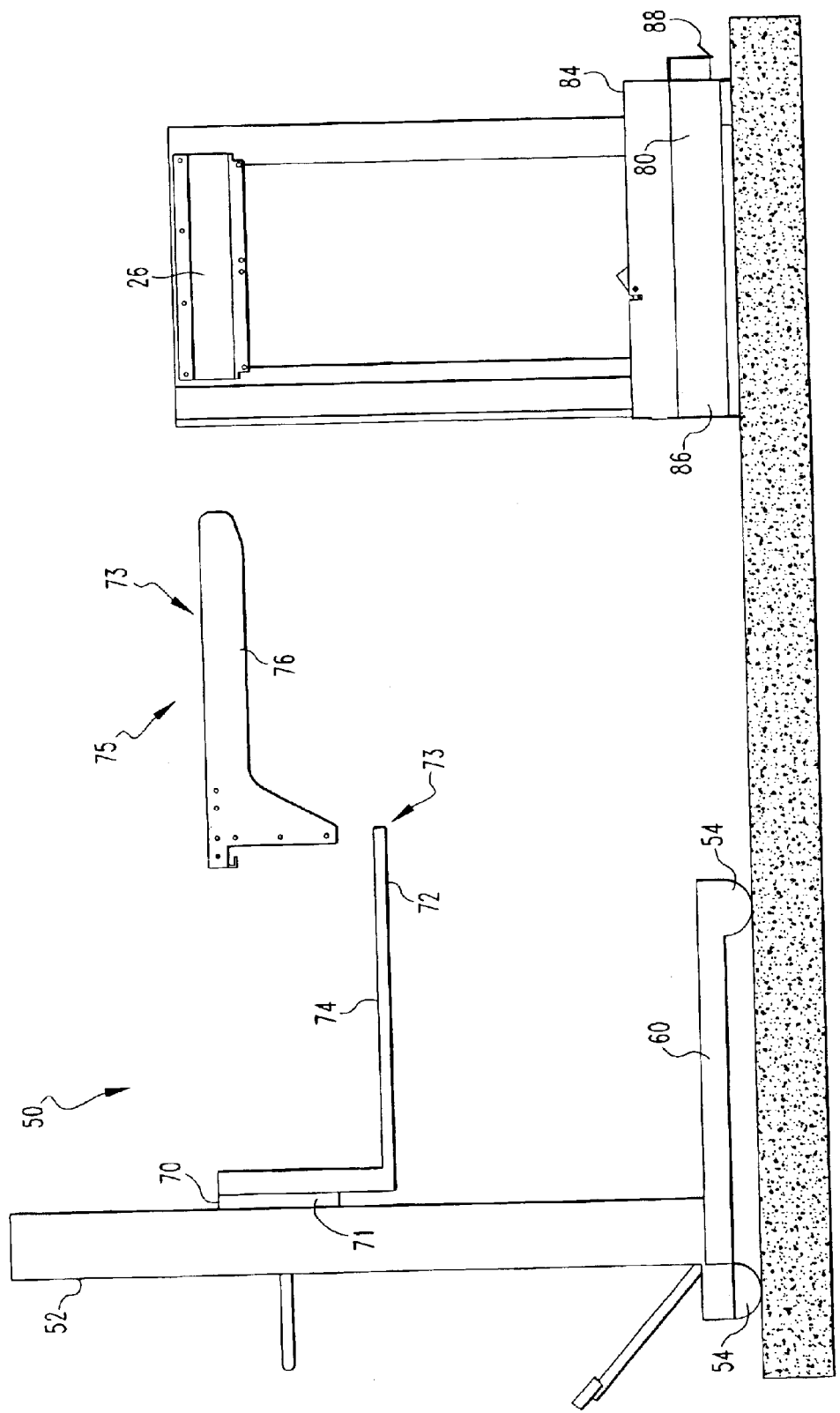
FIG. 5 is a schematic view of the dolly with different coupling devices.
Figure 6:
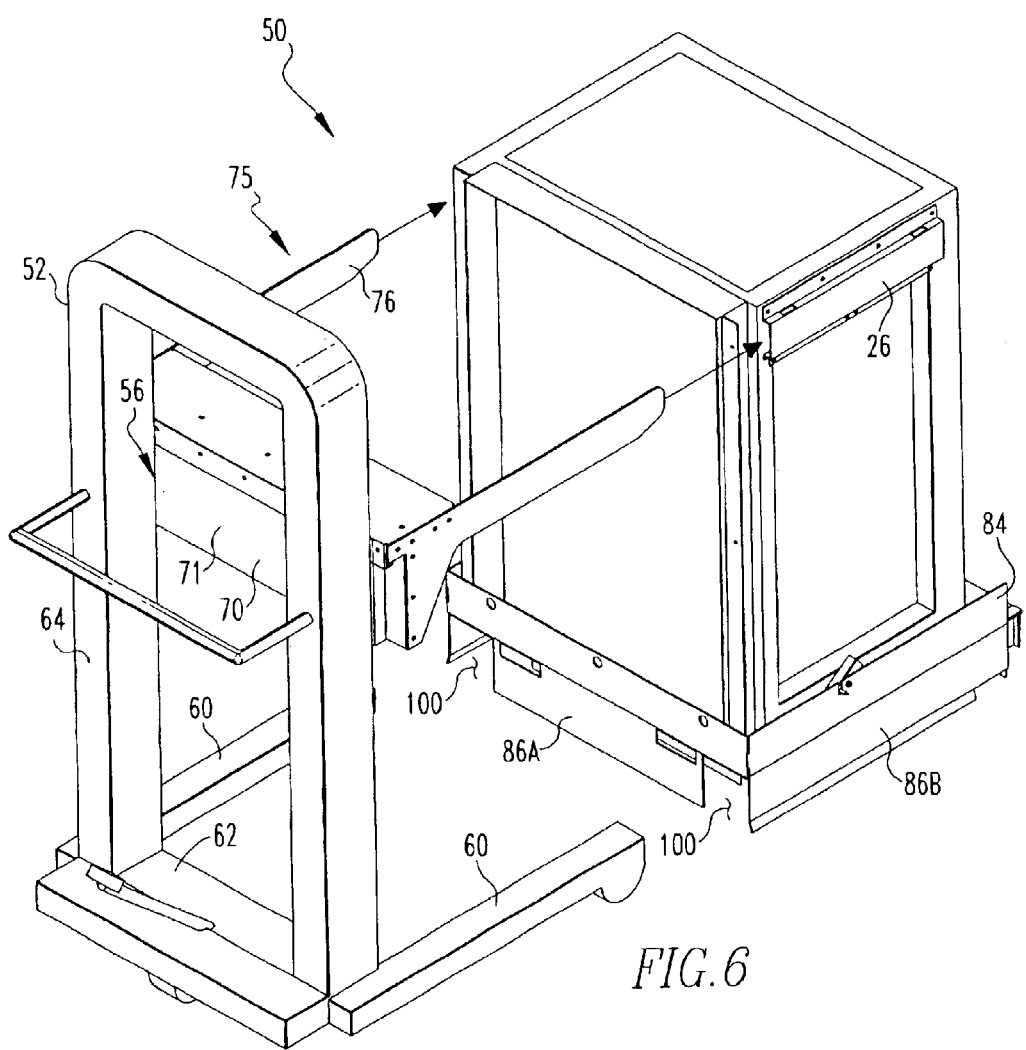
FIG. 6 is an isometric view of the dolly with a yoke assembly ready to engage the power bridge.

As shown in FIGS. 5 and 6, the dolly assembly 50 may further include a removable power bridge yoke assembly 75. The power bridge yoke assembly 75 includes two bridge forks 76 and a base member 77. The base member is structured to be coupled to the lifting device backplate 71. The bridge forks 76 are structured to fit within the roller assembly yoke brackets 26. Thus, as described hereinafter, the dolly assembly 50 may also be used to lift the power bridge 12 off of the skid table assembly 80, described hereinafter, so that the power bridge 12 may be placed on another structure, such as a shipping pallet or work table.

Figure 4A:
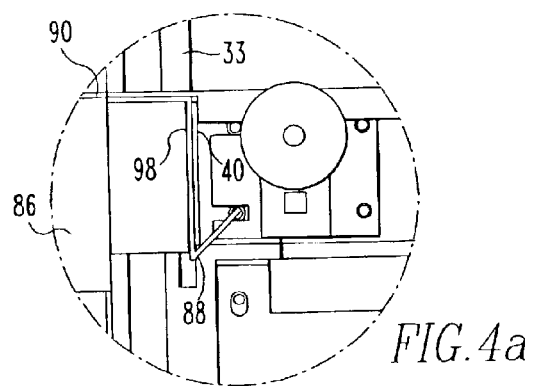
FIG. 4A is a detail view of the V-flange engaging the enclosure.

As further shown in FIGS. 1 and 4, another component of the power bridge rollout service system 10 is a skid table assembly 80. The skid table assembly 80 includes a generally flat, horizontal lifting plate 82, an upper sidewall 84, a plurality of lower sidewalls 86 and a coupling device 87, such as a V-flange 88. The coupling device 87 is structured to secure the dolly assembly 50 to the enclosure assembly 30 so that the dolly assembly 50 does not roll away from the enclosure assembly 30 as the roller assembly 20 is being moved between the enclosure assembly 30 and the dolly assembly 50. The lifting plate 82 has an upper surface 90, a front side 92, a back side 94, two lateral sides 96, and a flange extension 98. As shown in FIG. 4A, the flange extension 98 extends downwardly from the lifting plate front side 92. The flange extension 98 has a height generally equal to the height of the engagement member plate members 40. The V-flange 88 is disposed at the distal end of the flange extension 98 and is, generally a flange extending at an acute angle from the flange extension 98 and opening upwardly. The upper sidewall 84 extends upwardly, and generally perpendicularly to the lifting plate upper surface 90, from the back side 94 and the lateral sides 96. The lower sidewalls 86 extend downwardly, and generally perpendicularly to the lifting plate upper surface 90, from the back side 94 and the lateral sides 96. Unlike the upper sidewall 84, the lower sidewall 86 is not continuous. That is, there are gaps 100 between the back side lower sidewall 86A and the lateral side lower sidewalls 86B. These gaps 100 provide access for the lift fork 72 so that the lifting fork 72 can extend under the skid table assembly 80. Additionally, the gaps 100 provide access for the dolly lower horizontal members 60 when the skid table assembly 80 is resting on the ground.

The skid table assembly 80 may further include a locking device 110 structured to restrict movement of the roller assembly 20 when the roller assembly 20 is disposed on the skid table assembly 80. One embodiment of the locking device 110 is a wheel lock lever 112. The wheel lock lever 112 includes an elongated, rigid member 114 and a pivot rod 116. The pivot rod 116 is coupled to the upper sidewall 84 along a lateral side 96, preferably at a location that is spaced further from the lifting plate upper surface 90 than the height of the roller assembly wheels 24. The pivot rod 116 extends over the lifting plate 82. The wheel lock lever rigid member 114 is pivotally coupled to the pivot rod 116. The wheel lock lever rigid member 114 has a length greater than the height of the pivot rod 116 above the lifting plate upper surface 90. That is, wheel lock lever rigid member 114 contacts the lifting plate upper surface 90. There may be one or more such wheel lock levers 112 on each lateral side of the upper sidewall 84.

To install a power bridge 12, various components must be provided in an initial state for installation. That is, the power bridge 12 must be provided in a roller assembly 20 and located on, for example, a shipping pallet (not shown). Preferably, the power bridge external bus assembly 16 is not coupled to the power bridge 12. The enclosure assembly 30, the dolly assembly 50 and the skid table assembly 80 are further provided. Both the enclosure assembly 30 and the skid table assembly 80 are empty and certain enclosure assembly sidewalls 38 may be removed as required to provide access. The power bridge yoke assembly 75 is the work platform 73 coupled to the dolly assembly lifting device 56.

The power bridge 12 is then lifted into a position adjacent to the enclosure wheel tracks 34. This is accomplished by inserting the bridge forks 76 of the power bridge yoke assembly 75 into the roller assembly yoke brackets 26. The lifting device 56 is then actuated to lift the roller assembly 20 and power bridge 12 off the shipping pallet or other substrate. The roller assembly 20 and power bridge 12 are moved to a position over top of the skid table assembly 80. The roller assembly 20 and power bridge 12 are then lowered onto the skid table assembly 80 thereby coupling the roller assembly 20 and power bridge 12 to the work platform 73. The roller assembly 20 is oriented so that the roller assembly wheels 24 are disposed adjacent to the lateral sides of the skid table assembly upper sidewall 84. That is, the roller assembly wheels 24 are positioned to roll in a direction parallel to the lateral sides 96. The bridge forks 76 of the power bridge yoke assembly 75 are removed 220 from the roller assembly yoke brackets 26. The power bridge yoke assembly 75 is decoupled from the lifting device and the lift fork 72 is coupled to the lifting device 56. The lift fork elongated members 74 is positioned 226 under the skid table assembly 80 by moving the lift fork elongated members 74 through the gaps 100 in the skid table lower sidewall 86. The lifting device is actuated again to lift the skid table assembly 80 off the ground so that it may be moved.

The skid table assembly 80 is coupled to the enclosure assembly 30 as follows. The skid table assembly 80 is moved adjacent to the enclosure assembly 30 with the V-flange 88 located below the flat plates members 40 of the engagement member 36. The lifting device 56 is actuated to lift the skid table assembly lifting plate upper surface 90 to be generally parallel with the wheel tracks 34. As the skid table assembly lifting plate upper surface 90 moves adjacent to the wheel tracks 34, the V-flange 88 engages the engagement member 36. Typically, the engagement member 36 will engage a medial portion of the V-flange 88 while the table assembly lifting plate upper surface 90 is below the wheel tracks 34. Thus, as the skid table assembly lifting plate upper surface 90 moves adjacent to the wheel tracks 34, the engagement member 36 moving along the V-flange 88 causes the dolly assembly 50 to be pulled toward the enclosure assembly 30. When the engagement member 36 is at the vertex of the V-flange 88, the skid table assembly lifting plate upper surface 90 is generally parallel and immediately adjacent to the wheel tracks 34.

The power bridge 12 is then rolled into the enclosure assembly 30. If a locking device 110 has been used, the locking device 110 is released. If the locking device 110 is the wheel lock lever 112, the user simply moves the rigid member 114 to extend toward the enclosure assembly 30. Thus, as the roller assembly 20 is moved off the skid table assembly 80 and onto the wheel tracks 34, the roller assembly wheels 24 pass under the locking device pivot rod 116 and move the elongated member 114 out of the way. The power bridge 12 and roller assembly 20 are moved entirely into the enclosure assembly 30.

To complete the installation, any enclosure assembly sidewalls 38 that had been removed may be reinstalled and the power bridge external bus assembly 16 is coupled to the power bridge housing 14.

Removal of a power bridge 12 is essentially the installation operation in reverse. That is, the various components must be provided in an initial state for removal. The power bridge 12 is disposed in a roller assembly 20 which is further disposed with in an enclosure assembly 30. The roller assembly wheels 24 are located on the wheel tracks 34. The power bridge external bus assembly 16 is coupled to the power bridge housing 14. The dolly assembly 50 and the skid table assembly 80 are further provided. The dolly assembly 50 has the lift fork 72 attached to the lifting device 56. The skid table assembly 80 is empty and disposed on the lift fork 72.

The power bridge 12 is prepared for removal by removing the external bus assembly 16 and removing certain enclosure assembly sidewalls 38 as required to provide access. The power bridge 12 is removed as follows. The skid table assembly 80 is coupled to the enclosure assembly 30 as follows. The skid table assembly 80 is moved adjacent to the enclosure assembly 30 with the V-flange 88 located below the plate members 40 of the engagement member 36. The lifting device 56 is actuated to lift the skid table assembly lifting plate upper surface 90 to be generally parallel with the wheel tracks 34. As the skid table assembly lifting plate upper surface 90 moves adjacent to the wheel tracks 34, the V-flange 88 engages the engagement member 36. Typically, the engagement member 36 will engage a medial portion of the V-flange 88 while the table assembly lifting plate upper surface 90 is below the wheel tracks 34. Thus, as the skid table assembly lifting plate upper surface 90 moves adjacent to the wheel tracks 34, the engagement member 36 moving along the V-flange 88 causes the dolly assembly 50 to be pulled toward the enclosure assembly 30. When the engagement member 36 is at the vertex of the V-flange 88, the skid table assembly lifting plate upper surface 90 is generally parallel and immediately adjacent to the wheel tracks 34.

The power bridge 12 is then rolled onto the skid table assembly 80. If a locking device 110 has been used, the locking device 110 is set. If the locking device 110 is the wheel lock lever 112, the user simply moves the rigid member 114 to extend away from the enclosure assembly 30. Thus, as the roller assembly 20 is moved onto the skid table assembly 80, the roller assembly wheels 24 pass under the locking device pivot rod 116 and move the rigid member 114 out of the way. Once the roller assembly wheels 24 pass under the elongated member 114, the elongated member 114 falls back into contact with the lifting plate upper surface 90. If the roller assembly 20 moves toward the lifting plate front side 92, the roller assembly wheels 24 will contact the elongated member 114 and be prevented from moving forward.

The dolly assembly 50, carrying the power bridge 12, is, preferably, moved away from the enclosure assembly 30. The lifting device 56 is actuated to lower 332 the skid table assembly 80 to the ground. Once the skid table assembly 80 is on the ground, resting on the lower sidewalls 86, the dolly assembly 50 is moved 334 from under the skid table assembly 80. To lift the power bridge 12 and the roller assembly 20 off of the skid table assembly 80, the lift fork 72 is decoupled from the lifting device 56 and the power bridge yoke assembly 75 is coupled to the lifting device 56. Then, the power bridge yoke assembly 75 is inserted into the roller assembly yoke brackets 26. The lifting device 56 is then actuated to lift 344 the roller assembly 20 and power bridge 12 off the skid table assembly 80. The roller assembly 20 and power bridge 12 are then moved to a position over top of a shipping pallet, work area, or other support surface. The lifting device 56 is then used to lower the roller assembly 20 and power bridge 12 to the new surface.

Figure 7:
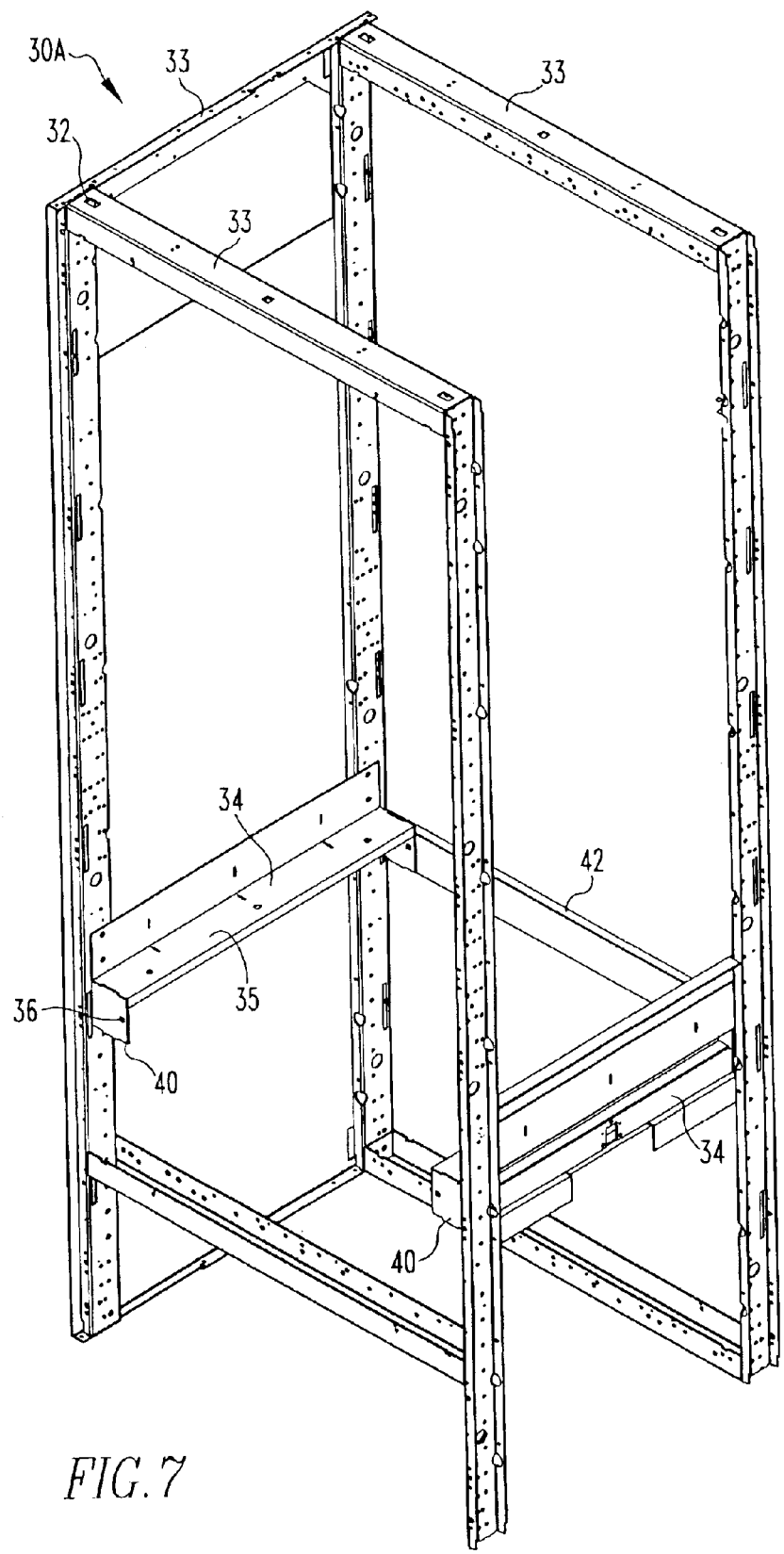
FIG. 7 is a partially cut-away isometric view of an alternate enclosure with the power bridge removed for clarity.

Alternatively, as shown in FIG. 7, an alternate enclosure assembly 30A may be formed without a frame member 33 immediately adjacent to the ground, thus allowing the dolly assembly 50 to enter the alternate enclosure assembly 30A. With such an alternate enclosure assembly 30A, the installation and/or removal of the power bridge 12 within a roller assembly 20 may be accomplished without use of the skid table assembly 80. That is, to install the power bridge 12, the components are provided 200 in an initial state as set forth hereinbefore. The dolly assembly 50 has the power bridge yoke assembly 75 work platform 73 attached thereto and the power bridge 12 and roller assembly 20 are disposed on a surface such as a pallet, work table or a skid table assembly 50. The lifting device 56 is actuated to align the power bridge yoke assembly 75 with the yoke brackets 26. The dolly assembly 50 is moved toward the power bridge 12 and the power bridge yoke assembly 75 engages the yoke brackets 26 thereby coupling the roller assembly 20 the work platform 73. The lifting device 56 is again actuated to lift the power bridge 12 and the roller assembly 20 off of the surface. The dolly assembly 50 is then positioned adjacent to, and facing, the alternate enclosure assembly 30A. The lifting device 56 is further actuated to raise the power bridge 12 and roller assembly 20 until the roller assembly wheels 24 are aligned with, or just above, the wheel tracks 34. The dolly assembly 50 is moved into the alternate enclosure assembly 30A thereby positioning the power bridge 12 and roller assembly 20 above the wheel tracks 34. The lifting device 56 is further actuated to lower the power bridge 12 and roller assembly 20 onto the wheel tracks 34 or enclosure frame assembly 32. The dolly assembly 50 is then moved 416 out of the alternate enclosure assembly 30A leaving the power bridge 12 and roller assembly 20 on the wheel tracks 34. Further assembly of the power bridge 12 is identical to procedure described above.

Removal of a power bridge 12 and roller assembly 20 from the alternate enclosure assembly 30A is, essentially, the reverse procedure. That is, the power bridge 12 is prepared for removal as described hereinbefore. The dolly assembly 50 has the power bridge yoke assembly 75 work platform 73 attached thereto and the power bridge 12 and roller assembly 20 are disposed on the wheel tracks 34 within the alternate enclosure assembly 30A. The lifting device 56 is actuated to raise the power bridge yoke assembly 75 to be aligned with the yoke brackets 26. The dolly assembly 50 is then moved into the enclosure assembly 30 while the power bridge yoke assembly 75 simultaneously engages the yoke brackets 26. The lifting device 56 is further actuated to raise the roller assembly 20 off of the wheel tracks 34. The dolly assembly 50 is withdrawn from the alternate enclosure assembly 30A thereby removing the power bridge 12 and roller assembly 20 from the alternate enclosure assembly 30A. The lifting device 56 may be actuated for a third time to lower the yoke brackets 26, and therefore the power bridge 12 and roller assembly 20, so that the dolly assembly 50 may be moved safely. As before, the power bridge 12 and roller assembly 20 may be placed on a pallet, work table, skid table assembly 80, or other surface.

While specific embodiments of the invention have been described in detail, it will be appreciated by those skilled in the art that various modifications and alternatives to those details could be developed in light of the overall teachings of the disclosure. For example, as shown in FIG. 8, the coupling device 87 that acts upon the engagement member 36 may not be a V-flange 88. The engagement member 36 may be a vertical plate 36A having an opening 37. The dolly assembly 50 may then include upwardly angled rods 89 which are structured to be passed through the openings 37. Accordingly, the particular arrangements disclosed are meant to be illustrative only and not limiting as to the scope of invention which is to be given the full breadth of the claims appended and any and all equivalents thereof.

What is claimed is:

1. A power bridge rollout service system for removing and installing a power bridge, said power bridge having a housing with an external bus assembly, said power bridge rollout service system comprising:

a roller assembly structured to support said power bridge and having a plurality of roller assembly wheels;

an enclosure assembly having an enclosure frame assembly with a plurality of frame members structured to support said power bridge;

a dolly assembly having a dolly assembly frame assembly, a vertical lifting device, and a plurality of dolly assembly wheels, said vertical lifting device and dolly assembly wheels coupled to said dolly frame assembly;

a work platform structured to be removably coupled to said vertical lifting device;

wherein said work platform may be coupled to said vertical lifting device and moved vertically to be aligned with said roller assembly and whereby said the work platform is disposed adjacent to said enclosure assembly so that said roller assembly may be coupled to said dolly assembly;

wherein said work platform is a power bridge yoke assembly having two bridge forks;

said roller assembly includes a pair of yoke brackets;

said power bridge yoke assembly is structured to engage said pair of yoke brackets; and wherein said vertical lifting device is structured to raise said power bridge yoke assembly bridge forks to be aligned with said pair of yoke brackets.

2. A power bridge rollout service system for removing and installing a power bridge, said power bridge having a housing with an external bus assembly, said power bridge rollout service system comprising:

a roller assembly structured to support said power bridge and having a plurality of roller assembly wheels;

an enclosure assembly having an enclosure frame assembly with a plurality of frame members structured to support said power bridge;

a dolly assembly having a dolly assembly frame assembly, a vertical lifting device, and a plurality of dolly assembly wheels, said vertical lifting device and dolly assembly wheels coupled to said dolly frame assembly;

a work platform structured to be removably coupled to said vertical lifting device;

wherein said work platform may be coupled to said vertical lifting device and moved vertically to be aligned with said roller assembly and whereby said the work platform is disposed adjacent to said enclosure assembly so that said roller assembly may be coupled to said dolly assembly;

wherein said work platform is a skid table assembly having a lifting plate;

said enclosure assembly includes a pair of wheel tracks sized and spaced to engage said roller assembly wheels;

wherein said lifting device is structured to raise said skid table assembly to the same general height as wheel tracks, whereby said skid table assembly is adjacent to said frame assembly wheel tracks so that said roller assembly and power bridge may be rolled between said enclosure assembly and said skid table assembly;

wherein said dolly assembly includes a coupling device structured to secure said dolly assembly to said enclosure assembly;

wherein said enclosure assembly includes an engagement member;

said skid table assembly includes a V-flange; and said V-flange structured to engage said engagement member as said lifting device lifts said skid table assembly whereby said skid table assembly is coupled to said enclosure assembly.

3. The power bridge rollout service system of claim 1, wherein said enclosure assembly is formed without a frame member immediately adjacent to the ground, whereby said dolly assembly may be moved into said enclosure assembly.

4. The power bridge rollout service system of claim 2, wherein said skid table assembly includes a locking device structured to resist movement of the roller assembly while the roller assembly is disposed on the skid table assembly.

5. The power bridge rollout service system of claim 4 wherein said locking device is at least one wheel lock lever, said wheel lock lever structured to engage one of said roller assembly wheels.

6. The power bridge rollout service system of claim 5, wherein said lifting plate has a front side, a back side and two lateral sides;

said skid table assembly includes at least one upper sidewall, said sidewall extending generally perpendicular to said lifting plate and extending from said back side and two lateral sides; and said at least one wheel lock lever coupled to one said sidewall.

7. The power bridge rollout service system of claim 2, wherein said skid table assembly has a front side and a back side; and said V-flange disposed on said front side.

8. A method of removing a power bridge from an enclosure assembly using a dolly assembly, said power bridge having an attached bus assembly and disposed in said enclosure assembly, said dolly assembly having a frame assembly, a lifting device coupled to said frame assembly, a plurality of wheels rotatably attached to said frame assembly, a lift fork, and a work platform, said lifting device structured to move said lift fork vertically; said lift fork coupled to said work platform, said method comprising the steps of:

a) removing said power bridge bus assembly;

b) coupling said work platform to said power bridge; and c) removing said power bridge from said enclosure assembly.

9. The method of claim 8, wherein said work platform is a power bridge yoke assembly, said power bridge has a pair of yoke brackets coupled thereto, and said enclosure assembly includes a frame assembly, said enclosure frame assembly being formed without a frame member immediately adjacent to the ground, whereby said dolly assembly may be moved into said enclosure assembly, and wherein said steps of coupling said work platform to said power bridge and removing said power bridge from said enclosure assembly include the steps of:

a) aligning said power bridge yoke assembly with said yoke brackets;

b) moving said dolly assembly into said enclosure assembly thereby inserting said power bridge yoke assembly into said yoke brackets;

c) actuating said lifting device to raise said power bridge off said enclosure assembly; and d) moving said dolly assembly out of said enclosure assembly while supporting said power bridge.

10. The method of claim 8, wherein said enclosure assembly has a pair of raised wheel tracks, said power bridge disposed in a roller assembly, said roller assembly structured to support said power bridge and having a plurality of wheels, said roller assembly wheels disposed on said wheel tracks, said work platform being a skid table assembly having a horizontal lifting plate, and wherein said steps of coupling said work platform to said roller assembly and removing said power bridge and roller assembly from said enclosure assembly include the steps of:

a) actuating said lifting device to raise said skid table assembly until said skid table assembly is generally parallel with, and adjacent to, said wheel tracks; and b) rolling said roller assembly over said wheel tracks and on to said skid table assembly.

11. The method of claim 10, wherein said enclosure assembly further includes an engagement member, said skid table includes a coupling device, and said step of actuating said lifting device to raise said skid table assembly until said skid table assembly is generally parallel with said wheel tracks includes the further step of engaging said coupling device to couple said dolly assembly to said enclosure assembly.

12. The method of claim 11, wherein said coupling device is a V-flange and said step of engaging said coupling device to couple said dolly assembly to said enclosure assembly includes the step of:

a) positioning said V-flange under said engagement member;

b) engaging said engagement member with said V-flange; and c) further lifting said skid table assembly whereby said V-flange causes said dolly assembly to securely mate with said enclosure assembly.

13. A method of installing a power bridge in an enclosure assembly, said power bridge having a detached bus assembly, said enclosure assembly having a frame assembly structured to support said power bridge, said dolly assembly having a frame assembly, a lifting device coupled to said frame assembly, a plurality of wheels rotatably attached to said frame assembly, a lift fork, and a work platform, said lifting device structured to move said lift fork vertically; said lift fork coupled to said work platform, said method comprising the steps of:

a) coupling said power bridge to said work platform;

b) moving said dolly assembly adjacent to said enclosure assembly;

c) actuating said lifting device to lift said power bridge;

d) transferring said power bridge to said enclosure assembly; and e) coupling said bus assembly to said power bridge.

14. The method of claim 13, wherein said work platform is a power bridge yoke assembly, said power bridge has a pair of yoke brackets coupled thereto, and said enclosure assembly frame assembly is formed without a frame member immediately adjacent to the ground, whereby said dolly assembly may be moved into said enclosure assembly, and wherein said steps of coupling said work platform to said power bridge and transforming said power bridge to said enclosure assembly include the steps of:

a) aligning said power bridge yoke assembly with said yoke brackets;

b) inserting said power bridge yoke assembly into said yoke brackets;

c) actuating said lifting device to raise said power bridge;

d) moving said dolly assembly into said enclosure assembly while supporting said power bridge;

e) actuating said lifting device to lower said power bridge on to said enclosure assembly; and f) moving said dolly assembly out of said enclosure assembly.

15. The method of claim 13, wherein said enclosure assembly has a pair of raised wheel tracks, said power bridge disposed in a roller assembly, said roller assembly structured to support said power bridge and having a plurality of wheels, said roller assembly wheels disposed on said wheel tracks, said work platform being a skid table assembly having a horizontal lifting plate, and wherein said steps of coupling said work platform to said power bridge and transferring said power bridge to said enclosure assembly include the steps of:

a) placing said roller assembly on said skid table assembly;

b) actuating said lifting device to lift said skid table assembly until said skid table assembly is adjacent to said wheel tracks; and c) rolling said roller assembly onto said wheel tracks, thereby moving said power bridge into said enclosure assembly.

16. The method of claim 15, wherein said enclosure assembly further includes an engagement member, said skid table assembly includes a coupling device, and said step of actuating said lifting device to raise said skid table assembly until said skid table assembly is generally parallel with said wheel tracks includes the further step of engaging said coupling device to couple said dolly assembly to said enclosure assembly.

17. The method of claim 16, wherein said coupling device is a V-flange and said step of engaging said coupling device to couple said dolly assembly to said enclosure assembly includes the steps of:

a) positioning said V-flange under said engagement member;

b) engaging said engagement member with said V-flange; and c) further lifting said skid table assembly whereby said V-flange causes said dolly.

* * * * *